(12) United States Patent
Petrovic

(10) Patent No.: US 9,381,891 B1
(45) Date of Patent: Jul. 5, 2016

(54) WINDSHIELD WIPER ARM STAND

(71) Applicant: Dino Petrovic, Chicago, IL (US)

(72) Inventor: Dino Petrovic, Chicago, IL (US)

( * ) Notice: Subject to any disclaimer, the term of this patent is extended or adjusted under 35 U.S.C. 154(b) by 0 days.

(21) Appl. No.: 14/732,966

(22) Filed: Jun. 8, 2015

(51) Int. Cl.
*F16M 13/00* (2006.01)
*B60S 1/04* (2006.01)
*B60S 1/34* (2006.01)
*F16M 11/24* (2006.01)
*F16M 11/04* (2006.01)

(52) U.S. Cl.
CPC ............. *B60S 1/0455* (2013.01); *B60S 1/34* (2013.01); *F16M 11/04* (2013.01); *F16M 11/24* (2013.01)

(58) Field of Classification Search
USPC .......................................................... 248/519
See application file for complete search history.

(56) References Cited

U.S. PATENT DOCUMENTS

| | | | | |
|---|---|---|---|---|
| 1,747,951 A * | 2/1930 | Reichert | ............. | A47F 7/06 211/30 |
| 5,101,531 A * | 4/1992 | Edwards | ............. | B60S 1/0402 15/250.16 |
| 5,505,413 A * | 4/1996 | Hennessey | ............. | G10G 5/00 248/166 |
| 5,628,084 A * | 5/1997 | Chen | ............. | B60S 1/0455 15/250.1 |
| 5,664,756 A * | 9/1997 | Liao | ............. | G10G 5/00 248/443 |
| 5,675,861 A * | 10/1997 | Ayers | ............. | B60S 1/0455 15/250.01 |
| 5,873,141 A * | 2/1999 | Tackett | ............. | B60S 1/0455 15/250.001 |
| 5,957,417 A * | 9/1999 | Yu | ............. | G10G 5/00 248/166 |
| 6,286,175 B1 * | 9/2001 | Lee | ............. | B60S 1/3413 15/250.01 |
| 6,367,749 B2 * | 4/2002 | Valiulis | ............. | A47B 91/00 211/190 |
| 6,772,981 B1 * | 8/2004 | Yu | ............. | G10G 5/00 248/122.1 |
| 7,002,066 B2 * | 2/2006 | Yu | ............. | G10G 5/00 84/327 |
| 7,300,027 B2 * | 11/2007 | Walker | ............. | G10G 5/00 248/121 |
| 7,394,006 B2 * | 7/2008 | Bordignon | ............. | F16M 11/24 248/443 |
| 7,470,843 B2 * | 12/2008 | Hsieh | ............. | G10G 5/00 84/327 |
| 7,536,744 B1 * | 5/2009 | Schrader | ............. | B60S 1/0455 15/250.001 |
| 8,166,604 B2 * | 5/2012 | Schrader | ............. | B60S 1/0455 15/250.001 |
| 8,365,345 B1 * | 2/2013 | Bush | ............. | B60S 1/3422 15/250.001 |
| 8,453,291 B2 * | 6/2013 | Schrader | ............. | B60S 1/0455 15/250.16 |
| 8,640,298 B2 * | 2/2014 | Schrader | ............. | B60S 1/0455 15/250.16 |
| D714,709 S * | 10/2014 | Bussard | ............. | D12/220 |
| 9,010,700 B1 * | 4/2015 | Cooper | ............. | G10G 5/00 248/166 |
| 2003/0221275 A1 * | 12/2003 | Shih | ............. | B60S 1/0455 15/250.19 |
| 2004/0056166 A1 * | 3/2004 | Harrison | ............. | G10G 5/00 248/434 |

\* cited by examiner

*Primary Examiner* — Monica Millner
(74) *Attorney, Agent, or Firm* — Elliot Mendelson

(57) ABSTRACT

The present invention provides a stand that sits on or about the windshield, underneath a windshield wiper arm, that is capable of supporting it so that the windshield wiper blade is raised off of the windshield. By doing so, the wiper blade is protected from freezing to the windshield, simplifying the act of snow and ice removal and protecting the wiper blade from damage that might otherwise ensue.

20 Claims, 9 Drawing Sheets

WINDSHIELD WIPER ARM STAND

CROSS-REFERENCE TO RELATED APPLICATION

Not Applicable

FEDERALLY SPONSORED RESEARCH OR DEVELOPMENT

Not Applicable.

FIELD OF INVENTION

The invention relates to a device to raise a wiper arm so as to elevate a windshield wiper blade off of the surface of a windshield.

BACKGROUND OF INVENTION

Winter is rough on windshield wiper blades. Under normal circumstances, a windshield wiper blade sits at rest pressed against the windshield. During cold winter months, the rubber of the wiper blade stiffens due to the cold and the resting pressure of the blade against the windshield causes the blade to freeze in a deformed shape which reduces the effectiveness of the wiper blade at clearing the windshield.

Additionally, changes in ambient temperature and internal car temperature frequently result in freeze-thaw situations where precipitation and/or condensation cause the wiper blades to freeze solidly to the windshield. Wiper blades frozen to the windshield interfere with the process of scraping and clearing ice from the windshield. Moreover, when an individual clears snow and ice from a windshield, the individual will typically use an ice scraper or other forcible means to free the blade from its entrapment, which risks damage to the wiper blade in the process.

To prevent this, when snow and/or freezing conditions are anticipated, some individuals will fold their wiper blades back so they stick far out in the air high off of the windshield. This is a less than ideal solution, as the wiper arms themselves are prone to damage in such a position. There is also concern that stretching the tension spring to such an extent may reduce the resting tension of the wiper against the windshield.

Certain devices for raising a windshield wiper off of a windshield are known in the art. For example, U.S. Pat. Nos. 5,873,141 and D714709 disclose simple peg-like spacers. However, these devices are primarily designed for protecting RV windshield wipers from deteriorating during warm weather storage and are poorly suited for winter use, being too small, insubstantial, and easily misplaced in snow cover. Because of the orientation of the device, it can only perform its function if the wiperblade is not directly beneath the wiper arm. Further, these devices are not free standing and rely entirely on the downward pressure of the wiper arm to stay in place.

Devices are also known that are permanently mounted to the wiper or wiper arm assembly. For example, U.S. Pat. No. 5,571,221 discloses a motor driven pusher rod that is used to lift the wiper arm and thereby lift the wiper blade from the windshield when the wiper is not in use. U.S. Pat. No. 5,628,084 discloses a mechanical arm permanently mounted to the wiper arm that can be swung down to lift the wiper arm sufficiently to raise the wiper blade from the windshield. In addition to the disadvantage of having to be permanently attached to the wiper arm, the moving parts of these devices are also prone to icing up during the winter months rendering them useless or worse yet, actually rendering the windshield wipers inoperable if the mechanism freezes solid in the open position.

Consequently, there is need in the art for improved means for preventing a windshield wiper blade from freezing to a windshield.

SUMMARY OF THE INVENTION

The object of the present invention is to provide a windshield wiper arm stand that may be used to address the aforementioned issues and deficiencies in the art. The present invention provides a stand that sits on the windshield and/or area thereabout, underneath and/or adjacent to a windshield wiper arm, supporting it so that the windshield wiper blade is raised off of the windshield. By doing so, the wiper blade is protected from freezing to the windshield, simplifying the act of snow and ice removal and protecting the wiper blade from damage that might otherwise ensue. The windshield wiper arm stand of the invention is not permanently mounted to the wiper arm, yet is more stable than simple peg-like devices and that simply fall away in the absence of downward pressure from the wiper arm.

Thus, the invention provides a windshield wiper arm stand having a stand, a main body, and a wiper arm support member, where the stand contains a plurality of legs connected to a lower portion of the main body, where each of the legs comprises an elongate member ending with a foot for resting on a region of a windshield (or area thereabout). The wiper arm support member having a first end, a first support region, and a second support region, the first end being connected to a front of the main body such that the first support region extends outward from the front of the main body at a first angle. The second support region forming a second angle with the first support region, such that the second support region extends upward, the first and second support regions having an upper and inner surface that provides a wiper arm receiving region to receive a wiper arm.

The invention also provides such windshield wiper arm stand that contains at least one wiper arm support member. The invention provides a windshield wiper arm stand according to any of the above, where the foot of at least two of the legs extends farther out horizontally from the front of the main body than does the far end of the wiper arm support member.

The invention also provides a windshield wiper arm stand as set forth in any of the above where the first support region extends about horizontally from the main body.

The invention further provides a windshield wiper arm stand according to any of the above, where the second support region extends vertically from the first support region, and the second angle is about 90 degrees.

The invention also provides a windshield wiper arm stand according to any of the above, where the stand additionally contains a secondary body section connected to an upper portion of the main body and the secondary body section has a printable surface.

The invention also provides a windshield wiper arm stand as set forth in any of the above that when in use, raises a wiper blade an average of about 0.5 to 1, 1 to 2, 2 to 5, or 5 to 10 cm from a windshield.

The invention further provides a windshield wiper arm stand according to any of the above, where the feet are comprised of an elastomeric material. The invention also provides such a windshield wiper arm stand where at least those portions of the stand that contact portions of the automobile when in use (such as the bottoms of the feet and the upper surface of the wiper arm supports) are coated in an elastomeric material. The invention also provides such a windshield wiper arm stand, where substantially the entire windshield wiper stand is coated in an elastomeric material.

The invention further provides a windshield wiper arm stand according to any of the above, where the wiper arm receiving region is at a height of about 30 to about 100 mm, about 35 to about 90 mm, or from about 55 to about 80 mm.

The invention also provides a windshield wiper arm stand according to any of the above, where the height of said wiper arm receiving region is adjustable.

The invention provides a windshield wiper arm stand having a base, a main body, and a wiper arm support member, where the base comprises a plurality of legs connected to a lower portion of the main body, and each of the legs comprises an elongate member having at it's end, a foot region for resting on a region of a windshield. The wiper arm support member having a proximal end, a distal end, and a wiper arm receiving region disposed between the proximal and distal ends, the proximal end being connected to a front of the main body such that the wiper arm support member extends outward from the front of the main body. The distal end having at least a portion it that is higher in elevation than the wiper arm receiving region.

The invention further provides a windshield wiper arm stand as set forth above, where the wiper arm receiving region comprises a recessed region selected from the group consisting of a concavity, dip, slot, trough, and channel.

The invention also provides a windshield wiper arm stand as set forth in any of the above, where the main body contains a printable surface.

The invention also provides a windshield wiper arm stand as set forth in any of the above, where each of the feet are composed of an elastomeric material.

The invention also provides a windshield wiper arm stand as set forth in any of the above, where the stand is coated in an elastomeric material.

The invention also provides a windshield wiper arm stand as set forth in any of the above, where the height of the wiper arm supports is adjustable.

The invention also provides a windshield wiper arm stand as set forth in any of the above, where the height of an upper surface of said wiper arm support is about 30 to about 100 mm, about 35 to about 90 mm, or from about 55 to about 80 mm.

The invention also provides a windshield wiper arm stand according to any of the above that when in use, raises a wiper blade an average of at least about 0.5 to 1, 1 to 2, 2 to 5, or 5 to 10 cm from a windshield.

DETAILED DESCRIPTION OF THE PREFERRED EMBODIMENTS

Figure 1:
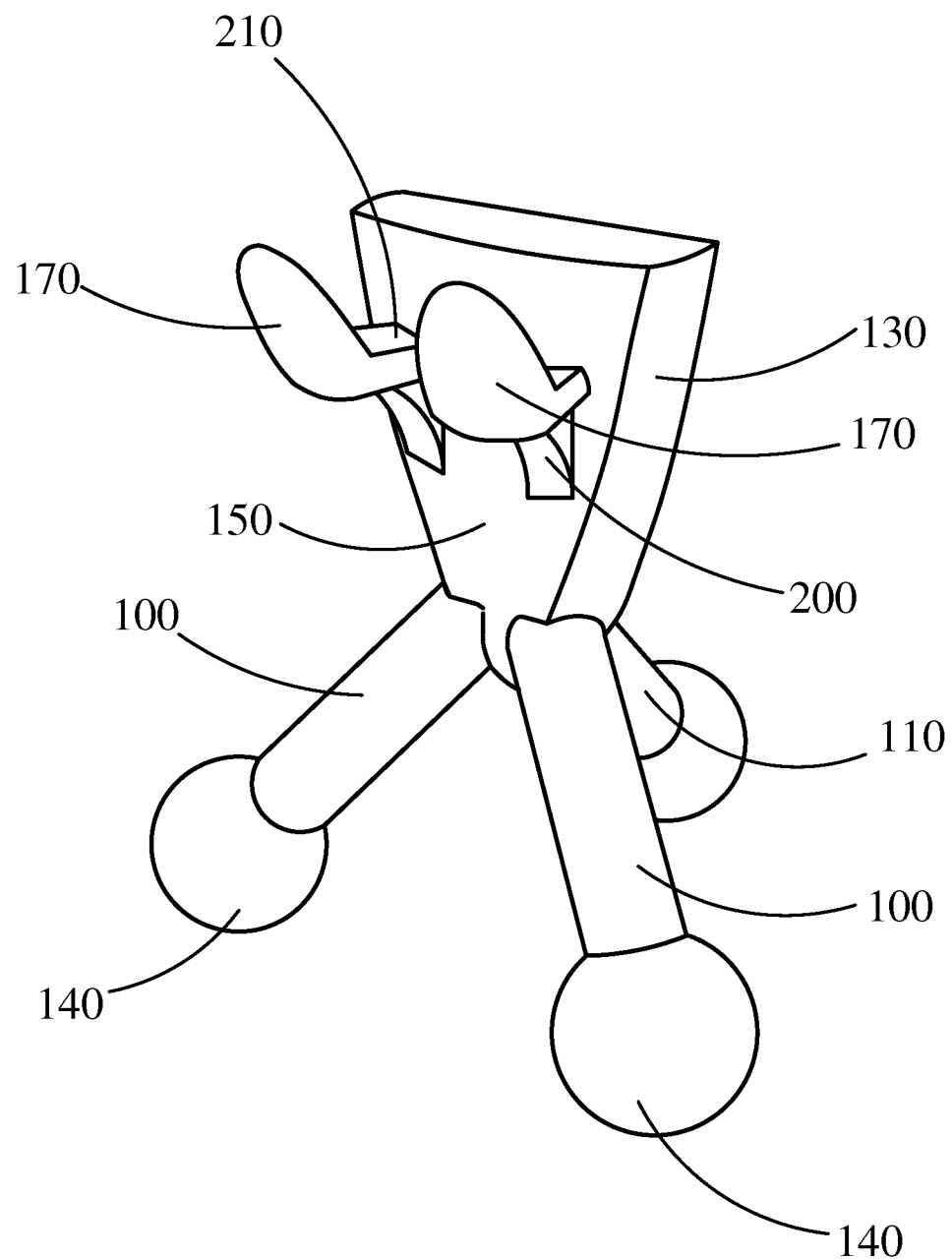
FIG. 1 is a perspective view of a windshield wiper arm stand according to the invention.

The wiper arm stand of the present invention fills a need in the art to provide a stand to temporarily elevate a windshield wiper arm so as to lift a windshield wiper blade off of the windshield when, during inclement weather, a vehicle is not in use. The stand of the invention is simple to manufacture, provides a stable wiper arm support that does not necessarily rely on the downward pressure of a wiper arm to keep it in place, and works on nearly all windshield wiper arm configurations.

The wiper arm stand of the present invention is generally comprised of three basic parts: a wiper arm support, a main body, and a base. The device may be composed of any suitably rigid material or combination of materials capable of supporting the weight of the wiper arm, including plastic, resin, glass, and/or metal. Exterior surfaces of the device may be coated in a softer elastomeric material, such as rubber or silicone to help protect automotive surfaces from damage. For example, the device may be composed primarily of a rigid thermoformed plastic and then coated in silicone.

The wiper arm stand is sized and configured so as to hold a windshield wiper arm in a moderately elevated position, such that the wiper blade portion of a windshield wiper assembly is raised off of the windshield. The wiper arm stand is generally sized and configured such that the upper surface of the wiper arm support, in the region where the wiper arm rests, is at an elevation of about 30 to about 100 mm, about 35 to about 90 mm, or from about 55 to about 80 mm, as measured when the wiper arm stand is placed on a flat horizontal surface.

In certain embodiments, the wiper arm stand is configured so that the height of the wiper arm support is adjustable. In such cases, wiper arm support height is generally adjustable within the range of heights specified above. Wiper arm support height may be adjustable by any suitable means, including for example, telescoping legs, replaceable legs of differing lengths, a telescoping main body, a threaded shaft to adjust the height of the main body and/or the wiper arm support, removable wiper arm supports attachable by pegs into an arrangement of holes in the main body located at differing heights, and/or height-adjustable wiper arm support(s). When so configured, the wiper arm stand of the invention will elevate the windshield wiper arm sufficiently to raise the wiper blades clear of the windshield on most automobiles.

Generally, it is desirable for the wiper arm stand to be configured so that, when in use, the wiper blade is raised an average of at least about 0.5 to 1, 1 to 2, 2 to 5, or 5 to 10 cm from the windshield. Ideally, when the wiper arm is resting on the wiper arm stand, the entire wiper blade will be raised clear of the windshield. However, certain wiper configurations cause the wiper blade to dip in one direction or the other. Consequently, it is permissible and still useful if with device still allows one end of the wiper blade to remain in contact the windshield. The user may not receive the maximal benefit from using the device, but it will still provide significant protection to the wiper blade and still facilitate the process of clearing ice from the windshield.

To help prevent the wiper arm from slipping off of the wiper arm stand, the wiper arm support may have a raised portion or side wall flanking the region upon which the wiper arm rests. Alternatively or in addition, the wiper arm support may contain a concavity, channel, or recessed region where the wiper arm will have a natural tendency to rest.

The wiper arm support may be a structure positioned above the main body. The wiper arm support may, for example, have a bottom and two side walls, defining a channel configured to hold a wiper arm. The height of the channel may be fixed or adjustable, for example, by means of a threaded screw into the main body below.

Often, however, windshield wiper arms are configured so that they are closely positioned above the wiper blade itself, leaving little or no room directly under the wiper arm for a wiper arm stand. In such cases, devices that require the area under the wiper arm to be vacant are unusable as, an object placed on the windshield and underneath the wiper arm will end up resting on the wiper blade instead of the wiper arm. This is highly undesirable, as it will distort the shape of the stiff and/or frozen rubber of a cold wiper blade, reducing the effectiveness of the wiper blade.

Consequently, in certain embodiments of the invention, the wiper arm stand has one or more wiper arm supports that extend outward from the front face of the main body of the wiper arm stand, configured to fit in the narrow space between the wiper blade and the wiper arm. The wiper arm support extends outward from the main body, generally about horizontally. However, the angle at which the wiper arm support initially extends outward from front face of the main body is not particularly critical, though it will generally range between about 45 degrees up or down from the horizontal (as measured when the wiper arm stand is placed on a horizontal surface). By having arms that extend outward from the body of the device, it is possible to situate the arms of the device between the wiper blade and the wiper arm, even if the wiper blade is situated directly below the wiper arm.

In certain embodiments, the wiper arm support(s) may be configured to help prevent the wiper arm from unintentionally slipping off when the wiper arm stand is used. For example, the upper surface of the wiper arm support may be angled upwards as it extends out from the main body. Alternatively, the distal end of the wiper arm support(s) may comprise a raised portion, such as an upward bend, curve, knob end, or other raised portion. The upper surface of the wiper arm support(s) may also be configured to have a recessed region such as a concavity, dip, slot, trough, or channel. The angle of attachment of the wiper arm support, the recessed region, and/or raised end portion, alone or in combination with a portion of the upper surface of the wiper arm support, provide a wiper arm rest region on the upper surface of the wiper arm support.

According to certain embodiments of the invention, the wiper arm support(s) may additionally comprise a wiper arm support bracket. The wiper arm support bracket is situated underneath the wiper arm support and provides additional structural strength to the wiper arm support.

The main body of the wiper arm stand provides a region for attachment of the base and a region for attachment of the wiper arm support(s). Although the main body of the wiper arm stand itself may be of any suitable shape, in many embodiments of the invention (and as depicted in the figures) the rear face of the main body contains a generally flat area, suitable for the printing of designs, patterns, logos, emblems and the like.

In certain embodiments of the invention, the wiper arm stand further includes a secondary body section connected to either the upper portion of the main body or to the rear face of the main body. The secondary body section may contain a generally flat area, suitable for the printing or embossing of designs, patterns, logos, emblems and the like. Secondary body sections may advantageously be manufactured and printed separately, then attached to the remainder of the device.

The base of the wiper arm stand is comprised of a plurality of legs configured to sit partially or entirely on a windshield. As windshields are not flat surfaces, three legs in the form of a tripod generally provides the most stable configuration. However, alternate leg configurations are also contemplated, including configurations that comprise two, four, five, or six legs. By providing a plurality of legs, the device is more stable and better suited to inclement weather than prior art devices that rely on the downward pressure of the wiper arm to stay in place or not tip over.

In some cases, the proximal end of the legs may be attached directly and permanently to the main body. In other embodiments, it may be advantageous for the legs to be removable. For example, removable legs may facilitate storage of the device when it is not in use. The legs may also be configured to be replaceable or telescopically adjustable, so as to change the overall height of the device. The legs may also be pivotally mounted to the lower portion of the main body, so as to fold closed for easy storage.

The distal end of each leg may end in a foot. Feet may be in a variety of suitable shapes. Suitable shapes include, for example, ball-shaped feet, straight, flat, or pointed feet. Feet may be coated with or composed entirely of silicon, rubber, or other softer elastomeric material, so as to reduce the likelihood of damage to the windshield. Feet ending in rounded and/or flattened bottom windshield-contacting surfaces are generally desired, both to help protect the windshield from damage and to facilitate removal from an icy windshield. Feet are generally molded, glued, of fused to the legs, so as to prevent them from separating from the legs.

According to certain embodiments of the invention, the device may also be configured to fold along a horizontal or vertical axis for easy storage. Similarly, the legs may also be pivotally attached and collapsible.

Figure 2:
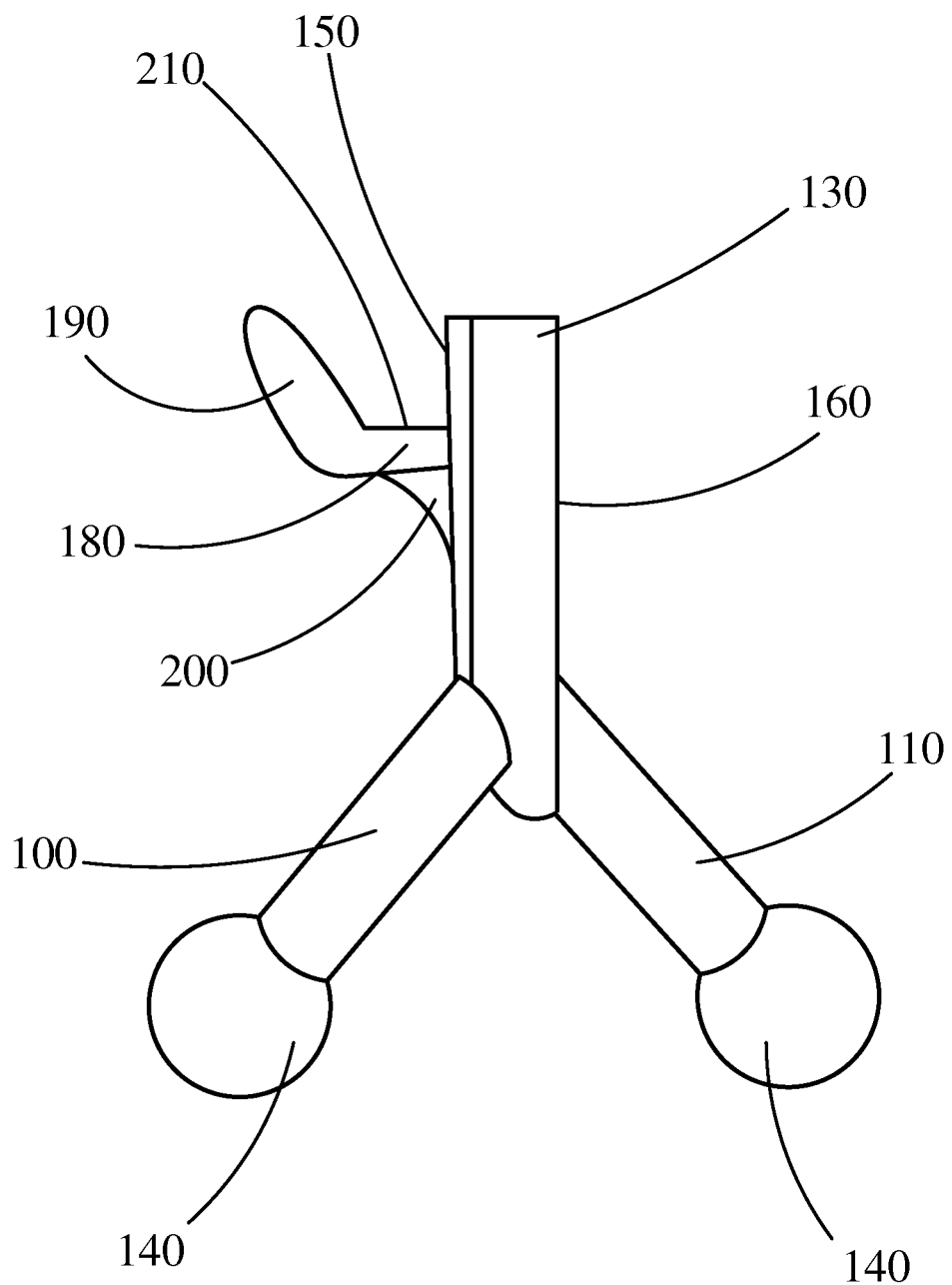
FIG. 2 is a side view of the windshield wiper arm stand shown in FIG. 1
Figure 3:
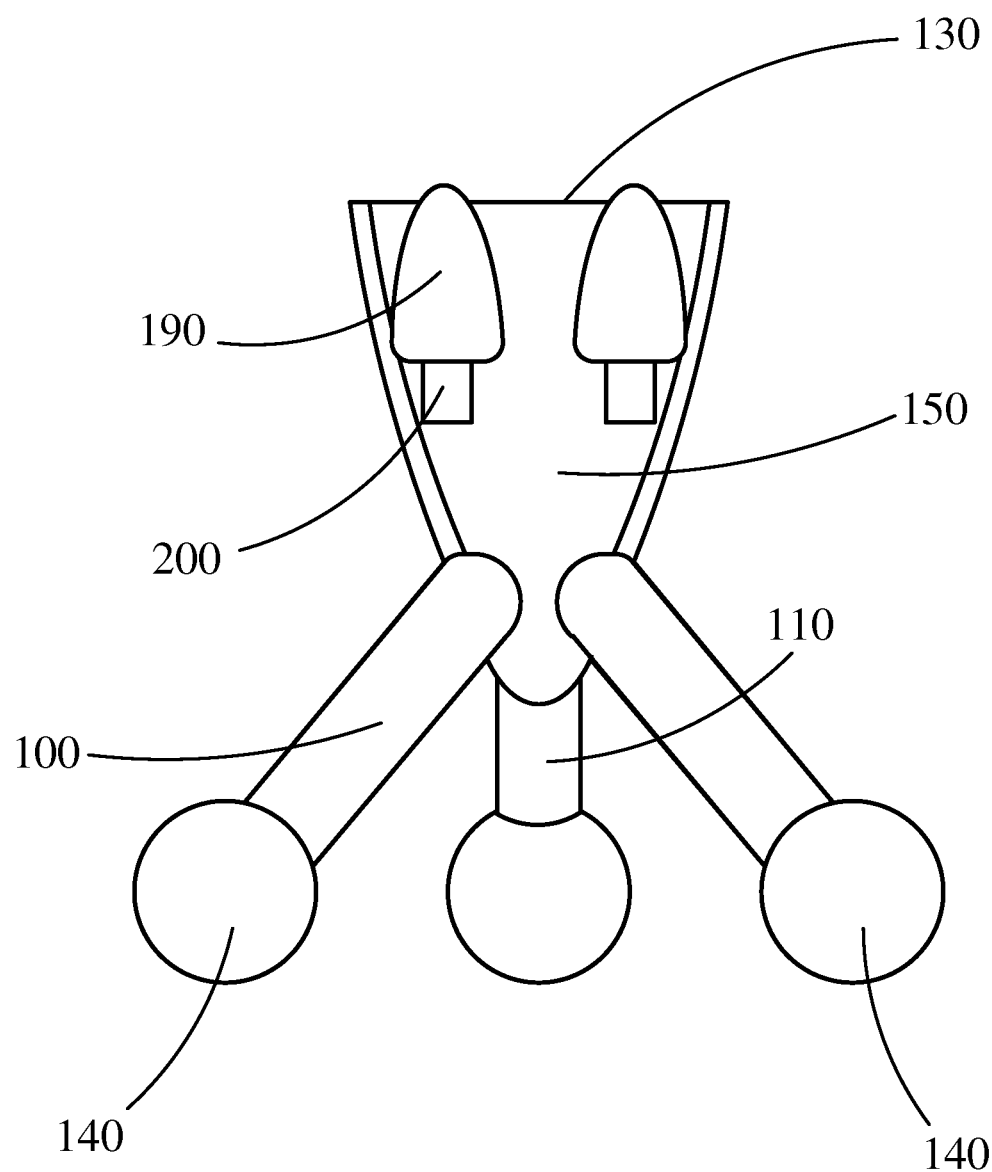
FIG. 3 is a front view of the windshield wiper arm stand of FIG. 1.

The nature of the invention may perhaps be better understood by reference to the attached figures. Referring to FIGS. 1-3, a device according to the present invention may include a stand portion having two forward legs 100 and a rear leg 110. At the upper, distal end, the legs are attached to a lower portion of the main body 130 and splay outwards in the form of a tripod. Legs 100 and 110 end in rounded, ball-shaped feet 140.

The main body 130 has a front face 150 and a rear face 160. The rear face 160 is generally flat and contains a region suitable for printing text and/or graphics. As depicted, the front face of the main body 150 contains two wiper arm supports 170. The wiper arm supports 170 have a first support region 180 that extends outward from the front face of the main body such that the upper surface of the first support region is about parallel to the surface upon which the wiper arm stand is placed. The wiper arm support further contains a second support region 190 that angles upwards. In use, this second wiper arm support region helps prevent the wiper arm from unintentionally slipping off of the wiper arm support. The wiper arm support is further strengthened by inclusion of optional support arm support 200. The upper surface of the wiper arm supports are thus configured so as to form a wiper arm receiving region 210.

In use, feet 140 rest upon the surface of the windshield and, in some cases, a portion of the automotive body immediately below the windshield. The two forward legs 100 provide stability to the wiper arm stand and keep it from tipping over when subjected to the downward force of a wiper arm resting on the wiper arm support region 210. The narrowness of the wiper arm supports 170 allows them to fit in the space between the wiper blade and a wiper arm. The rounded shape of feet 140 helps to protect the windshield and other surfaces of the automobile from damage.

Figure 4:
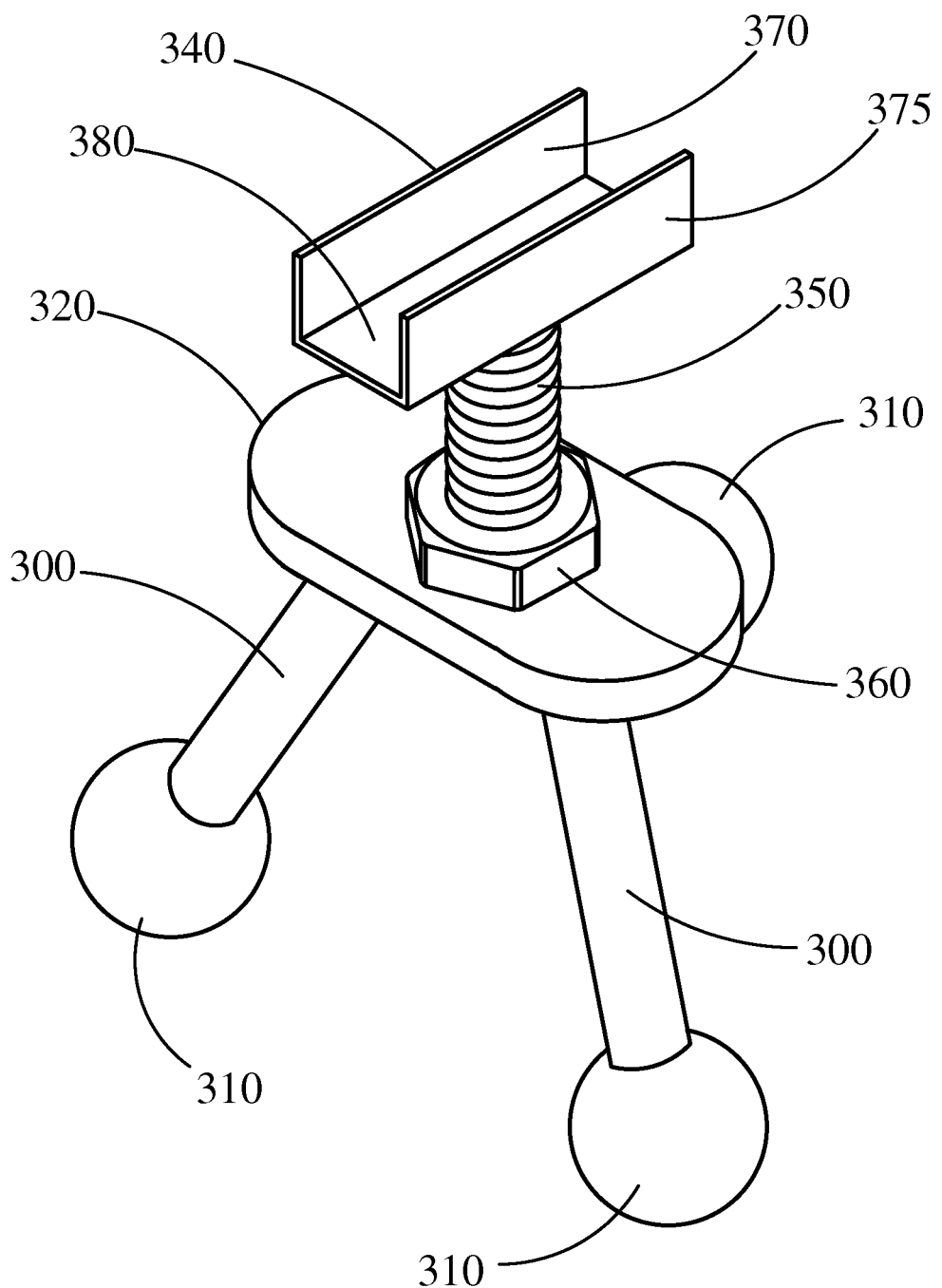
FIG. 4 is a perspective view of a windshield wiper arm stand according to the invention.
Figure 5:
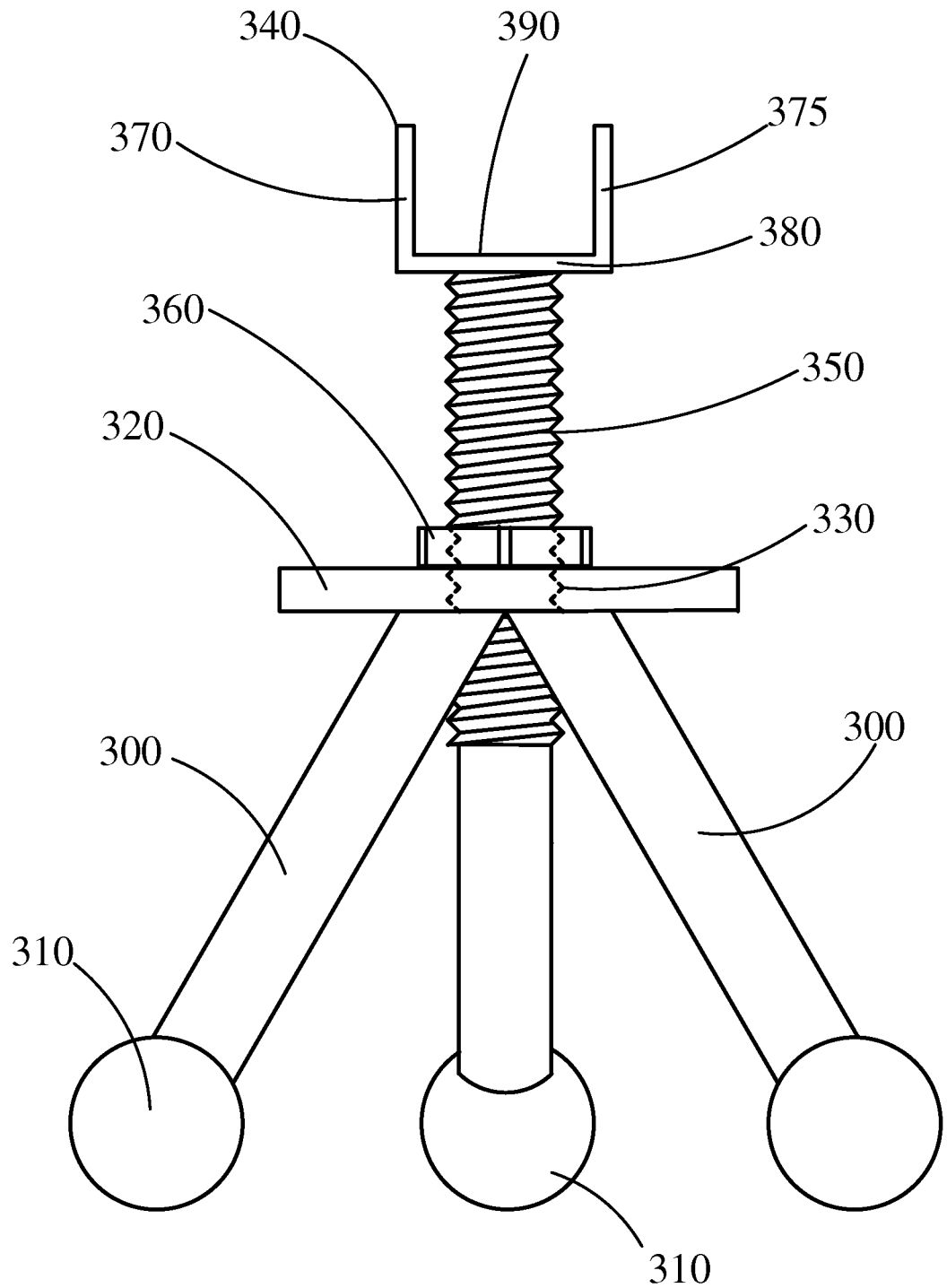
FIG. 5 is a front view of the windshield wiper arm stand of FIG. 4

An alternate form of a device according to the invention is shown in FIGS. 4-5. As depicted, the device contains three spaced-apart legs 300 that splay apart at the windshield contacting end, sloping inward to form a tripod. The lower, windshield contacting ends of the legs end in rounded ball feet 310 to help protect the windshield from damage and to facilitate removal from an ice-encrusted surface. The main body of the device 320 is operatively attached to legs 300.

Wiper arm support 340 contains side walls 370 and 375 and lower surface 380. Together, the side walls and lower surface define a channel that acts as the wiper arm receiving region 390. A threaded shaft 350 is attached to the underside of lower surface 380.

The main body 320 contains a centrally located threaded bore 330 that passes vertically through it. Wiper arm support 340 attaches to the main body 320 via threaded shaft 350. Overall height of the wiper arm support is adjustable by screwing threaded shaft 350 clock-wise or counter clockwise. Once the desired height has been determined, the wiper arm support can be locked in place by tightening down locknut 360 against the upper surface of the main body.

Figure 6:
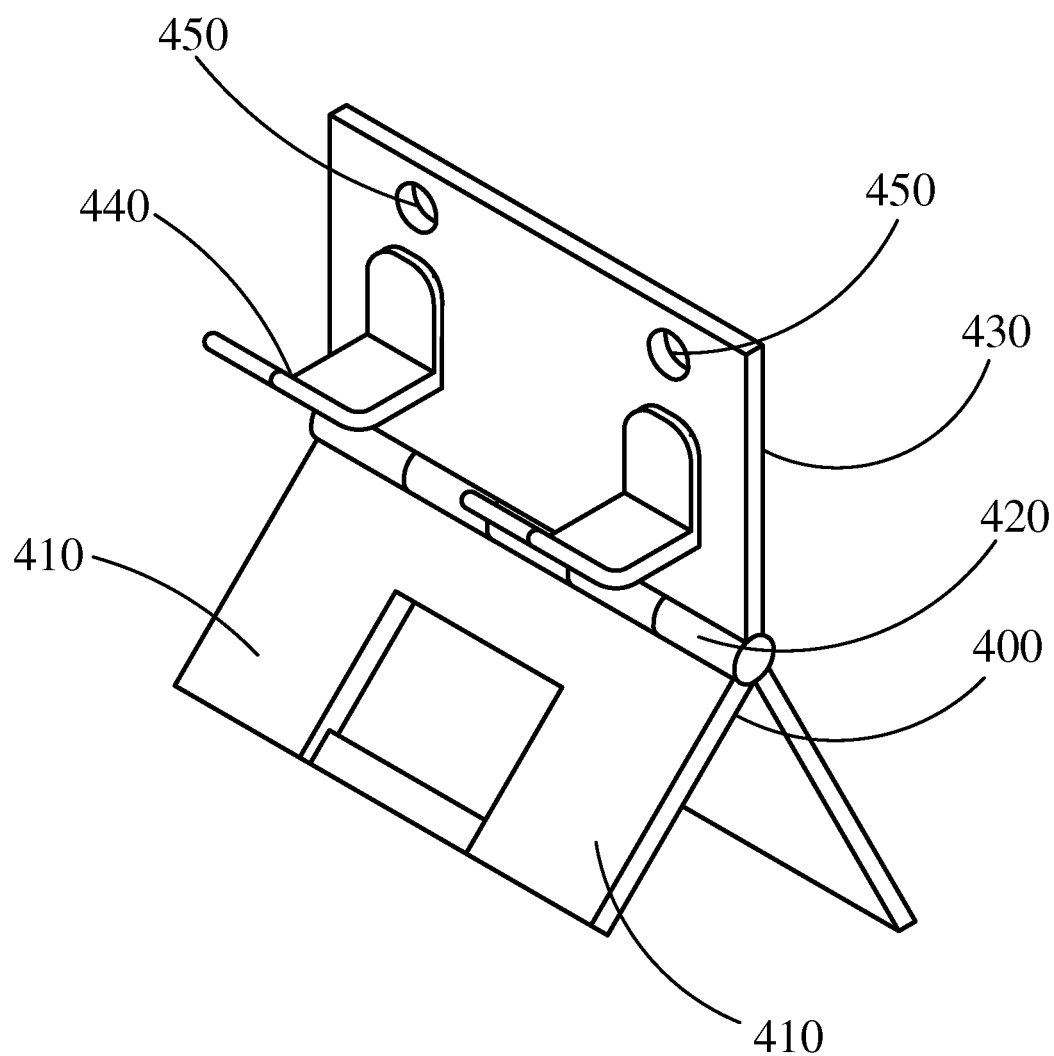
FIG. 6 is an isometric perspective view of a folding windshield wiper arm stand according to the invention.
Figure 7:
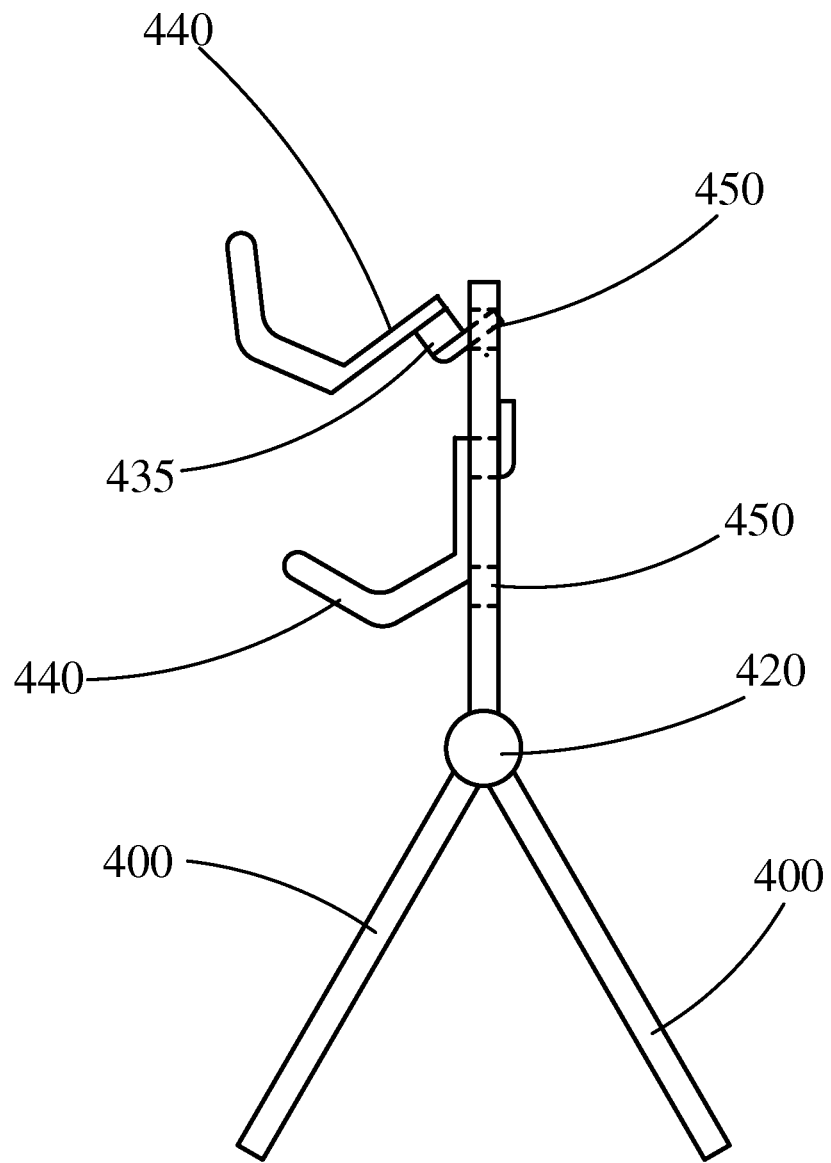
FIG. 7 is side view of the windshield wiper arm stand of FIG. 6, showing placement of wiper supports.

A foldable, card-like device according to the invention is exemplified in FIGS. 6-7. This embodiment of the invention has a foldable base 400 with cutouts to define legs 410. Front and rear legs can be folded together via hinge 420 for easy storage of the device when it is not in use. The device further contains a flat main body 430, bearing two wiper arm supports 440 that are attached via pegs 445 into holes 450 that pass horizontally through the main body. Wiper arm support height may be adjusted by selecting holes at differing heights.

Figure 8:
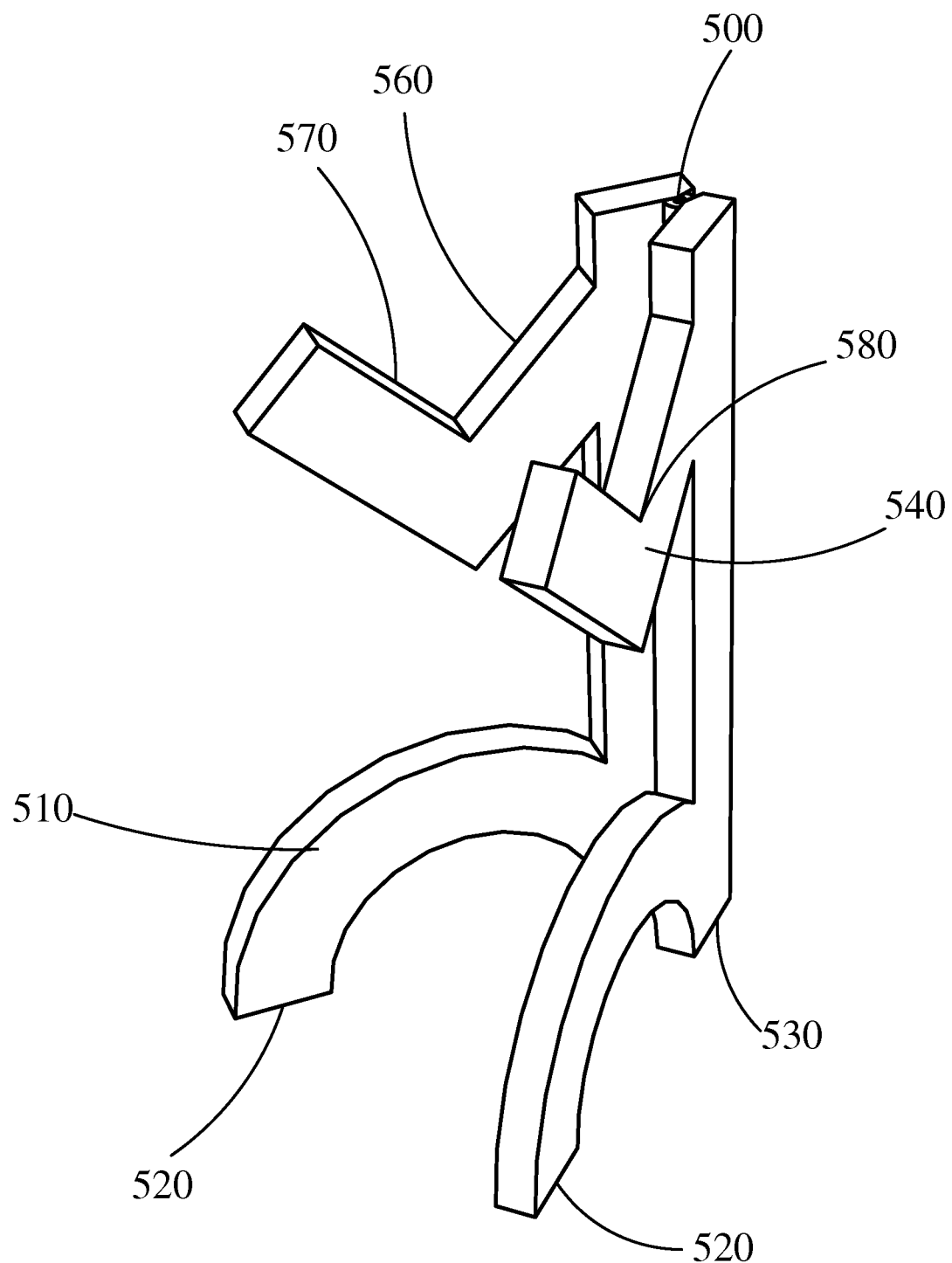
FIG. 8 is a front perspective view of a windshield wiper arm stand according to the invention in the open position.
Figure 9:
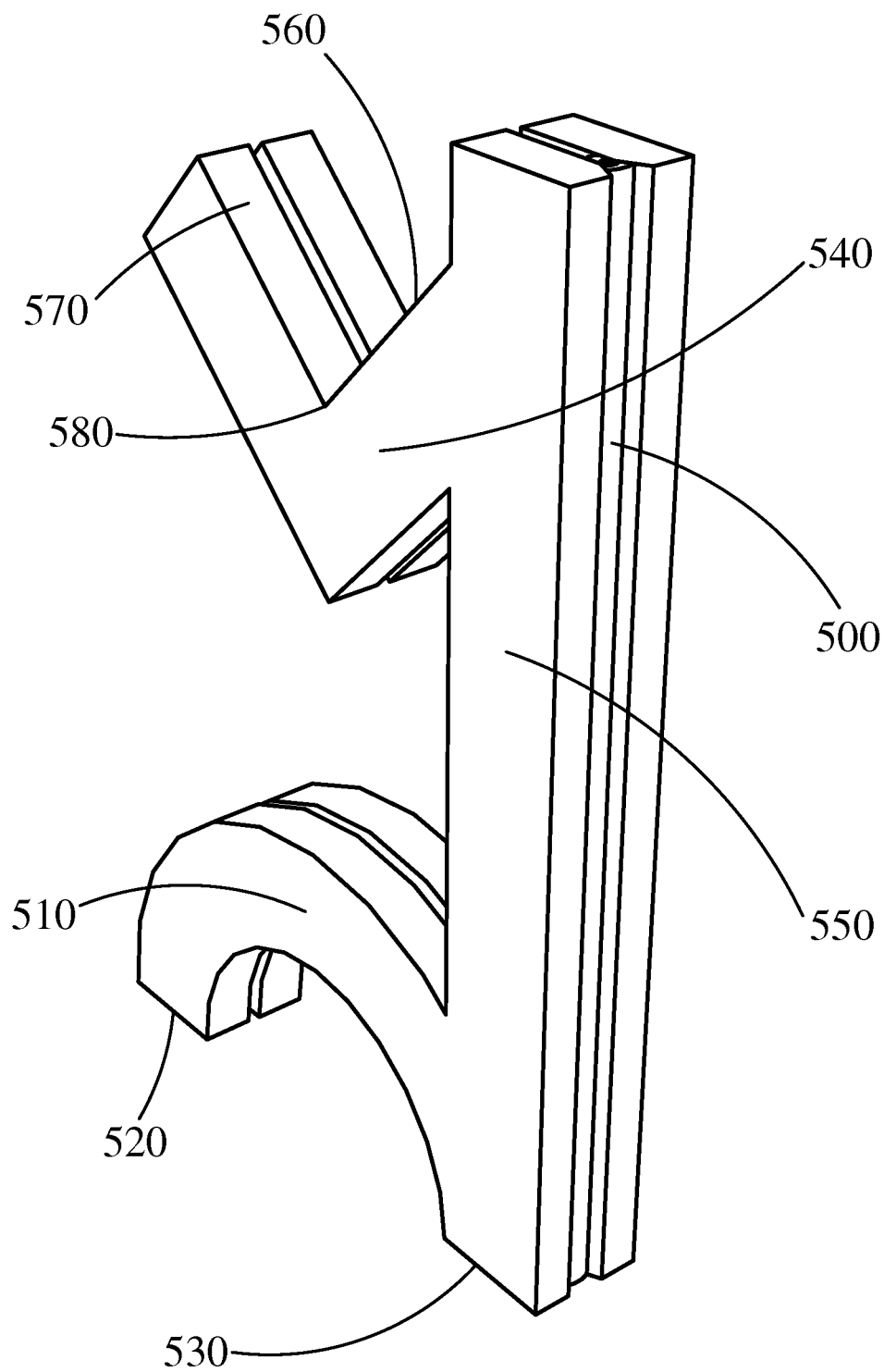
FIG. 9 is a rear perspective view of the windshield wiper arm stand of FIG. 8 in a closed position.

A device according to the invention may also take a more whimsical form. For example, FIGS. 8-9 show a device that gives the overall impression of being a seated character; legs and arms outstretched. The device is foldable along a vertical axis via hinge 500 for easy storage. The device contains two legs 510, each leg having a front foot region 520 and a rear foot region 530. The "arms" of the character act as wiper arm rests 540 that extend outward from the main body 550. As one moves from the end proximal to the main body out toward the distal end of the wiper arm support, the upper arm 560 of the character angles gently downward, whereas the forearm region 570 angles back upward. The upper surface of the wiper arm support, opposite the general area of the figure's elbow, acts as a wiper arm support region 580.

Although the present invention has been described in terms of the preferred embodiments, it is to be understood that such disclosure is not intended to be limiting. Various alterations and modifications will be readily apparent to those of skill in the art. Accordingly, it is intended that the appended claims be interpreted as covering all alterations and modifications as fall within the spirit and scope of the invention.

What is claimed is:

1. A windshield wiper arm stand for lifting a wiper arm relative to a windshield, comprising:
   a. a stand, a main body, and a wiper arm support member, said stand comprising a plurality of legs that splay outwardly and are connected to a lower portion of said main body, each of said legs comprising an elongate member having at a distal end thereof, a foot for resting on a region of the windshield to elevate said wiper arm;
   b. said wiper arm support member being configured to hold said wiper arm and to fit in a space between the wiper arm and wiper blade, said wiper arm support member having a first end, a first support region, and a second support region, said first end being connected to a front of the main body such that said first support region extends outward from the front of the main body at a first angle;
   c. said second support region forming a second angle with said first support region, such that said second support region extends upward, said first and second support regions having an upper and inner surface that provides a wiper arm receiving region to receive a wiper arm.

2. The windshield wiper arm stand of claim 1, further comprising a second wiper arm support member.

3. The windshield wiper arm stand of claim 2, wherein the foot of at least two of said plurality of legs extends farther horizontally from the front of the main body than the second end of the wiper arm support member.

4. The windshield wiper arm stand of claim 2, wherein the first support region extends about horizontally from the main body.

5. The windshield wiper arm stand of claim 4, wherein the second support region extends vertically from the first support region, and the second angle is about 90 degrees.

6. The windshield wiper arm stand of claim 2, further comprising a secondary body section connected to an upper portion of said main body, said secondary body section having a printable surface.

7. The windshield wiper arm stand of claim 2, wherein each of said feet comprises an elastomeric material.

8. The windshield wiper arm stand of claim 7, wherein at least said wiper arm receiving region is coated in an elastomeric material.

9. The windshield wiper arm stand of claim 8, wherein substantially the entire windshield wiper stand is coated in an elastomeric material.

10. The windshield wiper arm stand of claim 1, wherein said wiper arm receiving region is at a height of about 55 mm to about 80 mm.

11. The windshield wiper arm stand of claim 10, wherein the height of said wiper arm receiving region is adjustable.

12. The windshield wiper arm stand of claim 10, that when in use raises a windshield wiper blade fully off of a windshield.

13. A windshield wiper arm stand for lifting a wiper arm relative to a windshield, comprising:
   a. a base, a main body, and a wiper arm support member, said base comprising a plurality of legs that splay outwardly and are connected to a lower portion of said main body, each of said legs comprising an elongate member having at a distal end thereof, a foot region for resting on a region of the windshield to elevate said wiper arm;
   b. said wiper arm support member being configured to hold said wiper arm and to fit in a space between the wiper arm and wiper blade, said wiper arm support member having a proximal end, a distal end, and a wiper arm receiving region disposed between said proximate and said distal ends, said proximal end being connected to a front of the main body such that said wiper arm support member extends outward from the front of the main body;
   c. said distal end having at least a portion thereof being higher in elevation than said wiper arm receiving region.

14. The windshield wiper arm stand of claim 13, wherein said wiper arm receiving region comprises a recessed region selected from the group consisting of a concavity, dip, slot, trough, and channel.

15. The windshield wiper arm stand of claim 13, wherein main body comprises a printable surface.

16. The windshield wiper arm stand of claim 13, wherein each of said feet is composed of an elastomeric material.

17. The windshield wiper arm stand of claim 13, wherein the stand is coated in an elastomeric material.

18. The windshield wiper arm stand of claim 13, wherein the height of said wiper arm supports is adjustable.

19. The windshield wiper arm stand of claim 13, wherein the height of an upper surface of said wiper arm support is about 55 to about 80 mm.

20. The windshield wiper arm stand of claim 19, that when in use raises a windshield wiper blade at least about 1 cm from the surface of a windshield.

\* \* \* \* \*